US012560925B2

(12) United States Patent  (10) Patent No.: US 12,560,925 B2
Sellner  (45) Date of Patent: Feb. 24, 2026

(54) DYNAMIC ALLOCATION AND COORDINATION OF AUTO-NAVIGATING VEHICLES AND SELECTORS

(71) Applicant: Seegrid Corporation, Pittsburgh, PA (US)

(72) Inventor: Brennan Sellner, Pittsburgh, PA (US)

(73) Assignee: SEEGRID CORPORATION, Pittsburgh, PA (US)

( * ) Notice: Subject to any disclaimer, the term of this patent is extended or adjusted under 35 U.S.C. 154(b) by 340 days.

(21) Appl. No.: 18/199,052

(22) Filed: May 18, 2023

(65) Prior Publication Data

US 2023/0376030 A1  Nov. 23, 2023

Related U.S. Application Data

(63) Continuation of application No. 16/892,549, filed on Jun. 4, 2020, now Pat. No. 11,693,403.

(Continued)

(51) Int. Cl.
*G05D 1/00*  (2024.01)
*B66F 9/075*  (2006.01)
*G01C 21/20*  (2006.01)

(52) U.S. Cl.
CPC ....... *G05D 1/0027* (2013.01); *B66F 9/07581* (2013.01); *G01C 21/206* (2013.01);
(Continued)

(58) Field of Classification Search
CPC .. G05D 1/0016; G05D 1/0027; G05D 1/0212; G05D 1/0287
See application file for complete search history.

(56) References Cited

U.S. PATENT DOCUMENTS 4,328,545 A  5/1982  Halsall et al.
4,835,730 A  5/1989  Shimano et al.
(Continued)

FOREIGN PATENT DOCUMENTS

CN  101612997  12/2009
CN  203552302  4/2014
(Continued)

OTHER PUBLICATIONS

Canadian Office Action dated Jun. 4, 2025 issued in Canadian Application No. 314575.
(Continued)

*Primary Examiner* — Aaron L Troost
(74) *Attorney, Agent, or Firm* — Onello & Mello PC

(57) ABSTRACT

Dynamic allocation and coordination of auto-navigating vehicles uses robotic vehicles and centrally dispatched roaming order selectors to create a significantly more efficient, yet flexible, approach to picking goods within a warehouse. Robotic vehicles are configured to be loaded with goods from pick faces to fill orders. Each robotic vehicle follows a route that includes appropriate pick face locations. The robotic vehicles navigate from pick face to pick face where particular goods are located. Order selectors are dynamically and independently dispatched to meet the robotic vehicles at their pick face locations to load goods. Movement of the order selectors is orchestrated to increase efficiency in the order filling process within the warehouse.

20 Claims, 9 Drawing Sheets

Related U.S. Application Data

(60) Provisional application No. 62/856,865, filed on Jun. 4, 2019.

(52) U.S. Cl.
CPC .........  *G05D 1/0016* (2013.01); *G05D 1/0212*
(2013.01); *G05D 1/0287* (2013.01)

(56) References Cited

U.S. PATENT DOCUMENTS

| | | | |
|---|---|---|---|
| 5,323,321 | A | 6/1994 | Smith, Jr. |
| 5,434,490 | A | 7/1995 | Ishida et al. |
| 5,839,872 | A | 11/1998 | Goto et al. |
| 6,011,508 | A | 1/2000 | Perreault et al. |
| 6,652,213 | B1 | 11/2003 | Mitchell et al. |
| 8,386,399 | B2 | 2/2013 | Pillarisetti |
| 8,595,161 | B2 | 11/2013 | Bearman et al. |
| 8,639,644 | B1 | 1/2014 | Hickman et al. |
| 8,892,241 | B2 | 11/2014 | Weiss |
| 9,317,037 | B2 | 4/2016 | Byford et al. |
| 9,465,390 | B2 | 10/2016 | Mason et al. |
| 9,606,544 | B2 | 3/2017 | Gariepy et al. |
| 9,632,313 | B1 | 4/2017 | Madan et al. |
| 9,694,977 | B2 | 7/2017 | Aprea et al. |
| 9,760,086 | B2 | 9/2017 | Woodtli et al. |
| 9,785,911 | B2 | 10/2017 | Galluzzo et al. |
| 9,881,276 | B2 | 1/2018 | Cohn |
| 9,927,814 | B2 | 3/2018 | Wise et al. |
| 9,963,155 | B2 | 5/2018 | Gariepy et al. |
| 10,022,867 | B2 | 7/2018 | Saboo et al. |
| 10,040,630 | B2 | 8/2018 | Grinnell et al. |
| 10,055,645 | B1 | 8/2018 | Madan et al. |
| 10,134,006 | B2 | 11/2018 | Pandya et al. |
| 10,196,210 | B2 | 2/2019 | Welty et al. |
| 10,363,659 | B2 | 7/2019 | Wise et al. |
| 10,387,983 | B2 | 8/2019 | Kapuria |
| 10,399,777 | B2 | 9/2019 | Grinnell et al. |
| 10,423,150 | B2 | 9/2019 | Wise et al. |
| 10,589,931 | B2 | 3/2020 | Jarvis et al. |
| 10,591,592 | B2 | 3/2020 | Mindell et al. |
| 10,691,109 | B2 | 6/2020 | Wise et al. |
| 10,703,567 | B2 | 7/2020 | Grinnell et al. |
| 11,137,742 | B2 | 10/2021 | Wise et al. |
| 11,148,882 | B2 | 10/2021 | Mohan et al. |
| 11,693,403 | B2 | 7/2023 | Sellner |
| 11,934,181 | B2 | 3/2024 | Wise et al. |
| 2007/0061041 | A1 | 3/2007 | Zweig |
| 2009/0265106 | A1 | 10/2009 | Bearman et al. |
| 2011/0238205 | A1 | 9/2011 | Kemp et al. |
| 2011/0288695 | A1 | 11/2011 | Gariepy et al. |
| 2012/0065762 | A1 | 3/2012 | Pillarisetti |
| 2012/0330458 | A1 | 12/2012 | Weiss |
| 2013/0096735 | A1 | 4/2013 | Byford et al. |
| 2014/0088748 | A1 | 3/2014 | Woodtli et al. |
| 2015/0032252 | A1 | 1/2015 | Galluzzo et al. |
| 2016/0101940 | A1* | 4/2016 | Grinnell .............. G05D 1/0289 700/218 |
| 2016/0124434 | A1 | 5/2016 | Gariepy et al. |
| 2016/0129592 | A1 | 5/2016 | Saboo et al. |
| 2016/0132059 | A1 | 5/2016 | Mason et al. |
| 2016/0363659 | A1 | 12/2016 | Mindell et al. |
| 2017/0183159 | A1* | 6/2017 | Weiss ..................... B66F 9/0755 |
| 2017/0197643 | A1 | 7/2017 | Gariepy et al. |
| 2017/0252926 | A1 | 9/2017 | Wise et al. |
| 2017/0262790 | A1 | 9/2017 | Khasis |
| 2017/0276501 | A1 | 9/2017 | Wise et al. |
| 2017/0278051 | A1 | 9/2017 | Cohn |
| 2017/0297820 | A1 | 10/2017 | Grinnell et al. |
| 2017/0336780 | A1 | 11/2017 | Wise et al. |
| 2017/0337506 | A1* | 11/2017 | Wise ...................... B65G 67/04 |
| 2018/0108102 | A1* | 4/2018 | Kapuria ................. B65G 1/137 |
| 2018/0127211 | A1 | 5/2018 | Jarvis et al. |
| 2018/0158016 | A1 | 6/2018 | Pandya et al. |
| 2018/0201444 | A1 | 7/2018 | Welty et al. |
| 2018/0218218 | A1 | 8/2018 | Madan et al. |
| 2018/0346246 | A1 | 12/2018 | Grinnell et al. |
| 2019/0041868 | A1 | 2/2019 | Cantrell et al. |
| 2019/0389659 | A1 | 12/2019 | Grinnell et al. |
| 2020/0017297 | A1 | 1/2020 | Mohan et al. |
| 2020/0019144 | A1 | 1/2020 | Wise et al. |
| 2020/0231185 | A1 | 7/2020 | Shiu et al. |
| 2020/0387154 | A1 | 12/2020 | Sellner |
| 2021/0061565 | A1 | 3/2021 | Wise et al. |
| 2021/0233013 | A1 | 7/2021 | Liang et al. |
| 2021/0389751 | A1 | 12/2021 | Wise et al. |

FOREIGN PATENT DOCUMENTS

| | | |
|---|---|---|
| CN | 204308966 | 5/2015 |
| CN | 107479481 | 12/2017 |
| CN | 107770286 | 3/2018 |
| CN | 208580421 | 3/2019 |
| EP | 1331179 | 7/2003 |
| JP | 2000142965 | 5/2000 |
| JP | 2000177849 | 6/2000 |
| JP | 2018507151 | 3/2018 |
| JP | 2018507830 | 3/2018 |
| WO | 2016129045 | 8/2016 |
| WO | 2017153897 | 9/2017 |
| WO | 2017180366 | 10/2017 |

OTHER PUBLICATIONS

Extended European Search Report dated Mar. 24, 2023 issued in corresponding European Application No. 20819430.8.
International Search Report and Written Opinion dated Oct. 1, 2020 issued in corresponding International Application No. PCT/US2020/036044.
Japanese Office Action dated Dec. 3, 2024 issued in Japanese Application No. 2021571787, with machine translation to English.
Korean Office Action dated Jan. 31, 2024 issued in Korean Application No. 1020217041320, with English summary.
Japanese Office Action dated Jul. 23, 2024 issued in Japanese Application No. 2021571787, with machine translation to English.
European Office Action dated Dec. 6, 2023 issued in European Application No. 20819430.8.
Japanese Office Action dated May 27, 2025 issued in Japanese Application No. 2021571787, with machine translation to English.
Extended European Search Report dated Nov. 24, 2025 issued in European Application No. 25201778.5.

* cited by examiner

PICK FACE LIST

⊠0    ○1    ⊠2    ○3    ○4
○5    ○6    ○7    ⊠8    ○9
⊠10   ○11   ⊠12   ○13   ○14
○15   ○16   ○17

| Up | Down | Left | Right |

500

ENTER PICK LIST
510

USER INITIATE ROBOTIC
VEHICLE TRAVEL
512

ROBOTIC VEHICLE NAVIGATES
TO PICK FACE
514

PICK ITEM(S)
516

ROUTE
COMPLETE
518

N

Y

DELIVER LOAD
520

DYNAMIC ALLOCATION AND COORDINATION OF AUTO-NAVIGATING VEHICLES AND SELECTORS

RELATED APPLICATIONS

This application is a continuation application of U.S. patent application Ser. No. 16/892,549, filed Jun. 4, 2020, entitled Dynamic Allocation and Coordination of Auto-Navigating Vehicles and Selectors, now U.S. Publication No.: 2020/0387154, published Dec. 10, 2020, which claims benefit of U.S. Provisional Application No. 62/856,865, filed Jun. 4, 2019, and entitled DYNAMIC ALLOCATION AND COORDINATION OF AUTO-NAVIGATING VEHICLES AND SELECTORS, which is hereby incorporated by reference in its entirety.

FIELD OF INTEREST

The present inventive concepts relate to the field of systems and methods in the field of storage facility management, and more particularly to systems and methods involved in case picking or selection of goods in a warehouse environment.

BACKGROUND

A storage facility is a facility primarily used for storage of goods for commercial purposes, such as a warehouse. The storage is generally intended to be temporary, as such goods ultimately may be intended for a retailer, consumer or customer, distributor, transporter or other subsequent receiver. A warehouse can be a standalone facility, or can be part of a multi-use facility. Thousands of types of items can be stored in a typical warehouse. The items can be small or large, individual or bulk. It is common to load items on a pallet for transportation, and the warehouse may use pallets as a manner of internally transporting and storing items.

A well-run warehouse is well-organized and maintains an accurate inventory of goods. Goods can come and go frequently, throughout the day, in a warehouse. In fact, some large and very busy warehouses work three shifts, continually moving goods throughout the warehouse as they are received or needed to fulfill orders. Shipping and receiving areas, which may be the same area, are the location(s) in the warehouse where large trucks pick-up and drop-off goods. The warehouse can also include a staging area—as an intermediate area between shipping and receiving and storage aisles within the warehouse where the goods are stored. The staging area, for example, can be used for confirming that all items on the shipping manifest were received in acceptable condition. The staging area can also be used to build orders and pallets to fulfill orders that are to be shipped.

Goods in a warehouse tend to be moved in one of two ways, either by pallet or by cart (or trailer). A pallet requires a pallet transport for movement, such as a pallet jack, pallet truck, forklift, or stacker. A stacker is a piece of equipment that is similar to a fork lift, but can raise the pallet to significantly greater heights, e.g., for loading a pallet on a warehouse shelf. A cart requires a tugger (or "tow tractor"), which enables a user to pull the cart from place to place.

A pallet transport can be manual or motorized. A traditional pallet jack is a manually operated piece of equipment, as is a traditional stacker. When a pallet transport is motorized, it can take the form of a powered pallet jack, pallet truck, or forklift (or lift truck). A motorized stacker is referred to as a power stacker. A motorized pallet jack is referred to as a powered pallet jack, which an operator cannot ride, but walks beside. A pallet truck is similar to a powered pallet jack, but includes a place for an operator to stand.

As with motorized pallet transports, a tugger can be in the form of a drivable vehicle or in the form of a powered vehicle along the side of which the operator walks. In either form, a tugger includes a hitch that engages with a companion part on the cart, such as a sturdy and rigid ring or loop.

Various types of vehicles exist that can navigate without direct reliance on a human driver, such as autonomous mobile robots (AMRs), automatic guided vehicle (AGV, vision guided vehicles (VGV), and autonomous guided carts (AGCs), as examples. For purposes of brevity, such vehicles will be collectively referred to as AGVs. AGV forms of pallet trucks and powered tuggers exist. An AGV is a mobile robot that follows markers or wires in the floor, or uses vision or lasers to make its way without direct or remote control by an operator. They are most often used in industrial applications to move materials around a manufacturing facility or a warehouse, such as in the case of AGV forklifts and AGV tuggers.

FIG. 1 is a simplified diagram of a storage facility 100 in the form of a warehouse. Warehouse 100 includes a shipping & receiving area 110 and a staging area 112. A loading dock may be provided, where goods can be loaded on and unloaded from trucks 116. In the staging area, pallets 114 are shown, and may be loaded with warehouse goods to fulfill an order. When a pallet 114 is loaded with goods, it can remain in the staging area 112 or shipping and receiving area 110 until it is ready for loading on a truck 116. In which case, the pallet 114 is moved to the shipping & receiving area 110 and then onto the truck 116.

Warehouse 100 includes a plurality of aisles and storage spaces (collectively aisles 120) where the goods are intended to be stored in an orderly manner. Additionally, zones can be defined in a warehouse—as a means for categorizing areas within a warehouse. A zone can be defined for an aisle, group of aisles, portion of an aisle, or various combinations thereof. In FIG. 1, several zones are defined, including zones A-E.

When one or more orders is to be filled, a "pick list" is generated, which tells an order selector (or picker) which aisles to go to and which goods to pick. Pallet transports or tuggers and carts (collectively pallet transport 130) are sent through warehouse 100 with the order selector to "pick" cases, totes, cartons, or other forms of containers of goods (collectively "cases" herein). A "tote" is a container that is used to fill an order on a piece-by-piece basis, where the pieces are individual goods or groupings of relatively small goods. The goods are arranged in aisles 120, and the same goods are arranged as a "pick face." A "pick face" is a location, usually a two-dimensional facing or area, in a warehouse or stock area that is designated for the storage of one or more products and is accessible by an order selector for order filling. The cases are loaded on pallet transport 130 and brought to either the staging area 112 or shipping & receiving area 110.

FIG. 2 is a block diagram of a front view of an aisle and pick faces that can exist in aisle 120. In this view, four pick faces are shown, i.e., pick faces 0, 1, 5, and 6. Pick faces 0 and 1 are located on a shelf and pick faces 5 and 6 are at ground level. Each pick face is defined for a certain product. For example, pick face 0 shows 6 cases of the same product in FIG. 2.

There are different approaches to arranging products in a warehouse, which is referred to as "slotting." Slotting is viewed by many to be the key to the efficiency of the warehouse operation, where the highest possible "pick rates" are desired. Generally speaking, "pick rate" means the number of cases or units picked per unit of time per picker/selector.

One common approach to slotting products is to use item velocity. Generally, the more popular a product is, the higher its item velocity—the faster or more frequently it moves in and out of the warehouse. When slotting by item velocity, it is typical to keep the products with the highest item velocities in zones closest to the shipping & receiving 110 area (or staging area 112). Meanwhile, items with the lowest item velocities tend to be in zones furthest away. Slotting by item velocity can reduce travel time within a warehouse when filling orders. Reducing travel time is an important factor in increasing pick rates—so it is considered quite advantageous to slot by item velocity.

Another way to slot products in a warehouse is by product categories—grocery stores tend to use this approach. For example, paper products may be a product category. One or more product categories may exist within a zone. To increase efficiency with this type of product slotting, it may be advantageous to pick all products from a category that are needed to fill multiple orders—and then put the orders together in the staging area 112.

Still another slotting approach is "chaos" slotting, where slots are assigned quasi-randomly, with the objective of spreading a given good throughout the warehouse, thus allowing multiple nonconflicting simultaneous picks to occur. This makes more sense for an entity that has so many SKUs that fast movers are not a great differentiator.

There are many different methods for filling the order. The method chosen will typically depend on the way the products are slotted and whether or not cases are being picked versus individual products, e.g., a case of aspirin versus 12 bottles of aspirin. Some of the most common order picking methods are:

Single order picking—Each order selector selects a customer order and picks it to completion.

Batch picking—An order selector fills several orders at a time in order to reduce the amount of time spent traveling.

Pick and pass—Each order selector concentrates on his own area or zone and orders pass (mechanically or manually) from one order selector to the next.

Zone picking with aggregation on the shipping dock—Different zones send one or more cases to shipping for each order, and the cases from each zone are palletized together on the shipping dock.

Zone picking with aggregation at packing—Each zone sends one or more totes to a packing area (e.g., staging 112 in FIG. 1) with its portion of the order. At packing, all totes for an order are consolidated, and outbound cartons (e.g., boxes) are packed with the goods from the totes for a particular order.

Zone picking without aggregation—Each zone fills its carton for the order, and these are sent directly to the shipping trailer.

Unit sortation—Order selectors pull batches of product from their zones that are then sorted to the order by a tilt tray or cross-belt sorter.

The appropriateness of a particular order filling method will also depend on its impact on pick rates. The higher the overall pick rate, the more efficient and cost effective the warehouse.

Referring again to FIG. 1, a warehouse management system, or WMS, 140 is a key part of the supply chain and primarily aims to control the movement and storage of goods within warehouse 100. The WMS can process transactions associated with the movement of goods into, out of, and within the warehouse, including shipping, receiving, putaway and picking. "Putaway" generally refers to moving goods into the warehouse or storage area at their designated storage locations, e.g., zones and pick faces.

The WMS can provide a set of computerized procedures to handle the tracking and management of goods at a warehouse, model and manage the logical representation of the physical storage facilities (e.g. racking etc.), and enable a seamless link to order processing and logistics management in order to pick, pack and ship product out of the warehouse. Warehouse management systems can be stand-alone systems, or modules of an enterprise resource management system or supply chain execution suite. Orders can be electronically received by a WMS or manually input. Pick lists can be automatically or manually generated from the order, which can include route optimization performed by the WMS.

When picking cases to fill orders, it is typical to use pallet transports 130 that are navigated through the warehouse 100 to pick faces within zones to retrieve the necessary product cases. When doing so, the pallet transport 130 is navigated under the control of the order selector. That is, the order selector looks at a first/next item on a pick list, which indicates the aisle, pick face, and (optionally) zone where the corresponding product is located. The order selector drives the pallet transport to the pick face, and loads the appropriate number of cases on the pallet (or cart). This is done for each product on the pick list, until the order selector has worked completely through the pick list.

If the order selector is only picking for a particular zone, he can bring the pallet transport to the next zone and hand it off to the next order selector to continue working down the pick list. If the order selector is picking the complete pick list, then he can drive the pallet transport to the shipping & receiving area 110 or staging area 112 when the order is complete.

SUMMARY OF INVENTION

Provided are a system and method for coordinating the motions and actions of two disparate classes of actors that need to coordinate at varying meeting points in time/space.

In various embodiments, the system and method could include dynamic allocation and coordination of auto-navigating vehicles. The dynamic allocation and coordination of auto-navigating vehicles uses robotic vehicles and centrally dispatched roaming order selectors to create a significantly more efficient, yet flexible, approach to picking goods within a warehouse. Robotic vehicles are configured to be loaded with goods from pick faces to fill orders. Each robotic vehicle follows a route that includes appropriate pick face locations. The robotic vehicles navigate from pick face to pick face where particular goods are located. Order selectors are dynamically and independently dispatched to meet the robotic vehicles at their pick face locations to load goods. Movement of the order selectors is orchestrated to increase efficiency in the order filling process within the warehouse.

In accordance with aspects of the present invention, provided is an automated case picking method. The method comprises providing a representation of a storage facility and pick lists in an electronic memory, each pick list providing identifications of items to be picked from a plurality of different pick locations to fulfill an order, wherein each pick location is designated for storage of one or more products. For each pick list, electronically generating a route within the storage facility comprising the pick locations for the pick list. The method includes electronically transmitting routes to a plurality of robotic vehicles, each robotic vehicle configured to auto-navigate to each pick location on a received route, electronically tracking locations of the robotic vehicles and a plurality of mobile selector units, and electronically determining and communicating navigation instructions to the plurality of mobile selector units based, at least in part, on locations of the mobile selector units and the robotic vehicles and next pick locations of the robotic vehicle routes. The navigation instructions received by each mobile selector unit are configured to direct the mobile selector unit to a next pick location on a route of one of the robotic vehicles and each mobile selector unit can service routes of more than one of the robotic vehicles. Further, each vehicle may be serviced by one or more mobile selector units.

The storage facility can be a warehouse.

In various embodiments, the method can further comprise a warehouse database having the representation of the storage facility and the pick lists in an electronic memory.

In various embodiments, the method can further comprise at least one processor accessing the warehouse database and electronically generating one or more of the routes.

In various embodiments, the method can further comprise the at least one processor electronically transmitting the routes to the plurality of robotic vehicles.

In various embodiments, the method can further comprise the at least one processor electronically tracking locations of the robotic vehicles and the mobile selector units.

In various embodiments, the method can further comprise the at least one processor electronically determining and communicating navigation instructions to the plurality of mobile selector units.

In various embodiments, the method can further comprise including the at least one processor wirelessly communicating the navigation instructions to the plurality of selector units.

In various embodiments, the method can further comprise the at least one processor dynamically determining and wirelessly communicating next navigation instructions to the plurality of selector units based, at least in part, on changes in the locations of the mobile selector units and the robotic vehicles.

In various embodiments, the method can further comprise the representation of the storage facility comprising a plurality of zones and determining the navigation instructions for the robotic vehicles is independent of the zones.

In various embodiments, the method can further comprise, after the mobile selector unit navigates to the next pick location, the mobile selector unit receiving instructions to navigate to a new next pick location in a different zone.

In various embodiments, the method can further comprise the mobile selector units are configured for wireless communication.

In various embodiments, the method can further comprise the plurality of mobile selector units includes handheld mobile terminals.

In various embodiments, the method can further comprise the plurality of mobile selector units includes mobile phones, tablets, phablets, wearable/augmented reality devices (e.g. Microsoft HoloLens or Google Glass), Bar code scanners (with some level of onboard display & logic), voice-interaction-only devices (e.g. Vocollect belt pack and headset), gesture-interaction-only devices, and/or a combination of two or more thereof.

In various embodiments, the method can further comprise the mobile selector units include one or more user interface devices, including at least one pick-complete device that, when actuated, generates a pick-complete signal indicating that loading of products from a pick location to the robotic vehicle has been completed and the robotic vehicle is clear to proceed to a new next pick location on its route.

In various embodiments, the method can further comprise the mobile selector unit communicating the pick-complete signal to the robotic vehicle.

In various embodiments, the method can further comprise the mobile selector unit communicating the pick-complete signal to the at least one processor.

In various embodiments, determining the navigation instructions includes processing the locations of the mobile selector units and robotic vehicles and the next pick locations to reduce travel distances and/or times of the mobile selector units.

In various embodiments, determining the navigation instructions includes processing the locations of the mobile selector units and robotic vehicles and the next pick locations to manage fatigue of one or more of the selector units, maximize warehouse throughput, and/or meet predetermined deadlines, e.g., provided by the WMS.

In various embodiments, determining the navigation instructions includes processing the locations of the mobile selector units and robotic vehicles and the next pick locations for congestion avoidance.

In various embodiments, determining the navigation instructions is further based on an estimated time of arrival to the next pick locations by the robotic vehicles and/or the selector units.

In various embodiments, the plurality of robotic vehicles can include a tugger, a forklift, a high-lift or powered stacker, and/or a pallet truck.

The robotic vehicle can be a tugger.

The robotic vehicle can be a forklift.

The robotic vehicle can be a high-lift or powered stacker.

The robotic vehicle can be a pallet truck and the load platform can be a pallet. In some embodiments, the load platform could also be some sort of pallet fixture such that the pallet can be dropped on top of the pallet jack forks, e.g. if interacting with forklifts at the start and end of a picklist.

The robotic vehicle can be a tugger and the load platform can be a cart. Vehicles where the load rests on the vehicle itself rather than being pulled behind it.

In accordance with another aspect of the inventive concepts, provided is an electronic travel management method. The method comprises providing a management system in communication with a plurality of robotic vehicles and a plurality of mobile selector units, each robotic vehicle executing a route and each mobile selector unit having a wireless communication device, wherein each route comprises a pick list identifying pick locations of items to be picked to fulfill an order. The method includes the management system tracking locations and movement of the robotic vehicles along their respective routes, tracking locations of the mobile selector units, and directing the mobile selector units to future locations of the robotic vehicles based on locations of the robotic vehicles, routes of the robotic vehicles, and locations of the mobile selector units. Future locations of the robotic vehicles include future pick locations of the respective robotic vehicle routes.

In various embodiments, directing the mobile selector units includes electronically determining and wirelessly communicating navigation instructions to the mobile selector units.

In various embodiments, the method includes the management system inferring a location of at least one of the mobile selector units from at least one of a last known pick location, a next known pick location, and an estimate of mobile selector travel speed and/or past measurements of mobile selector travel speed.

In various embodiments, the routes are within a storage environment and the management system further comprises an electronic representation of the storage environment and the pick lists and wherein directing the mobile selector units is further based on the electronic representation of the storage environment and the pick lists.

In various embodiments, the electronic representation of the storage environment comprises a plurality of zones and the directing of the mobile selector units includes providing navigation instructions for at least one of the mobile selector unit to travel among plural zones.

In various embodiments, the electronic representation of the storage environment comprises a plurality of zones and the directing of the mobile selector units includes providing navigation instructions for the mobile selector units constrains travel of at least one mobile selector unit within a single zone.

In various embodiments, the method further includes, after directing a mobile selector unit to navigate to a pick location on a route of a first robotic vehicle, the management system directing mobile selector unit to navigate to a next pick location on a different route of a second robotic vehicle.

In various embodiments, the next pick location is in the same zone as the pick location of the first robotic vehicle.

In various embodiments, the next pick location is in a different zone than the pick location of the first robotic vehicle.

In various embodiments, the plurality of robotic vehicles includes a tugger, forklift, high-lift, and/or pallet truck.

In various embodiments, at least one of mobile selector units includes a handheld mobile terminal.

In various embodiments, the handheld mobile terminal is chosen from a group consisting of: mobile phones, voice-only devices, augmented-reality devices, barcode scanners, tablets, and/or phablets.

In various embodiments, the mobile selector units include one or more user interface devices, including at least one pick-complete device that, when actuated, generates a pick-complete signal indicating that loading of products from a pick location to a robotic vehicle has been completed and the robotic vehicle is clear to proceed to a next pick location on its route.

In various embodiments, the method includes the mobile selector unit communicating the pick-complete signal to the robotic vehicle.

In various embodiments, the method includes the mobile selector unit communicating the pick-complete signal to the management system.

In various embodiments, directing the mobile selector units includes the management system determining navigation instructions by processing the locations of the mobile selector units and robotic vehicles and the subsequent pick locations to reduce travel distances and/or times of the mobile selector units.

In various embodiments, directing the mobile selector units includes the management system determining navigation instructions by processing the locations of the mobile selector units and robotic vehicles and the subsequent pick locations for congestion avoidance.

In various embodiments, directing the mobile selectors units includes determining navigation instructions further based on an estimated time of arrival to a next pick location by at least one robotic vehicle and/or at least one mobile selector units.

In accordance with another aspect of the inventive concepts, provided is an electronic travel management system. The system comprises one or more processors, logic and memory devices, and wireless communication devices cooperatively coupled together; and travel management logic embodied in logic and memory devices. The travel management logic is executable under the control of the one or more processors to communicate with a plurality of autonomous vehicles each executing a route, communicate with a plurality of mobile selectors, each having a wireless mobile selector communication device, track locations and movement of the autonomous vehicles along their respective routes, track locations of the mobile selector communication devices, and direct the mobile selector communication devices to future locations of the autonomous vehicles based on locations of the autonomous vehicles, routes of the autonomous vehicles, and locations of the mobile selector devices.

In accordance with another aspect of the inventive concepts, provided is an electronic travel management system. The system comprises one or more processors, logic and memory devices, and wireless communication devices cooperatively coupled together; and travel management logic embodied in logic and memory devices. The travel management logic is executable under the control of the one or more processors to communicate with a plurality of autonomous vehicles each executing a route, communicate with a plurality of mobile selectors, each having a wireless mobile selector communication device, track locations and movement of the autonomous vehicles along their respective routes, track locations of the mobile selector communication devices, and orchestrate travel of the mobile selector communication devices and/or the autonomous vehicles based on locations of the autonomous vehicles, routes of the autonomous vehicles, and locations of the mobile selector devices.

In various embodiments, the system can be configured to generate navigation instructions to the mobile selector units to direct and/or orchestrate travel.

In various embodiments, system can be configured to reduce travel distances and/or times of the mobile selector units and/or the autonomous vehicles to direct and/or orchestrate travel.

In various embodiments, system can be configured to perform congestion avoidance analysis to direct and/or orchestrate travel of the mobile selector units and/or autonomous vehicles.

In various embodiments, system can be configured to estimate time of arrival to a next location by the mobile selector units and/or the autonomous vehicles to direct and/or orchestrate travel.

In various embodiments, one or more of the routes comprises a plurality of pick faces and the system is configured to wirelessly direct at least one mobile selector communication device to a next pick face of a route for one or more of the autonomous vehicles.

In various embodiments, system can be further configured to generate one or more of the routes and transmit the routes to one or more of the autonomous vehicles.

In various embodiments, system can be further configured to infer the locations of the mobile selector units from at least one of last known pick, next known pick, and an estimate of mobile selector travel speed and/or past measurements of mobile selector travel speed.

In various embodiments, system can be further configured to electronically determine and communicate navigation instructions to the plurality of mobile selector units.

In various embodiments, system can be further configured to dynamically determine and wirelessly communicate next navigation instructions to the plurality of mobile selector units based, at least in part, on changes in the locations of the mobile selector units and the autonomous vehicles.

In various embodiments, wherein the routes of the autonomous vehicles pass through a plurality of predetermined zones, and travel of at least one of the mobile selector units is confined by the system to a subset of the zones.

In various embodiments, wherein the travel of at least one of the mobile selector units is confined by the system to a single zone from a plurality of zones.

In various embodiments, wherein the plurality of autonomous vehicles includes a tugger, forklift, high-lift, and/or pallet truck.

In various embodiments, wherein the plurality of mobile selector units includes handheld mobile terminals.

In various embodiments, wherein the plurality of mobile selector units includes at least one mobile phones, voice-only devices, augmented-reality devices, barcode scanners, tablets, and/or phablets.

In various embodiments, wherein the plurality of mobile selector units includes vehicle-based mobile terminals.

In various embodiments, wherein at least one of the mobile selector units includes one or more user interface devices that outputs a next location and/or travel path to the next location for the mobile selector unit.

In various embodiments, wherein at least one of the mobile selector units includes at least one pick-complete device that, when actuated, generates a pick-complete signal indicating that loading of products from a pick location to the autonomous vehicle has been completed and the autonomous vehicle is clear to proceed to a new next pick location on its route.

In various embodiments, wherein the mobile selector unit is configured to communicate the pick-complete signal to the autonomous vehicle.

In various embodiments, wherein the mobile selector unit is configured to communicate the pick-complete signal to the system.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. In the drawings.

DETAILED DESCRIPTION OF PREFERRED EMBODIMENT

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Figure 3:
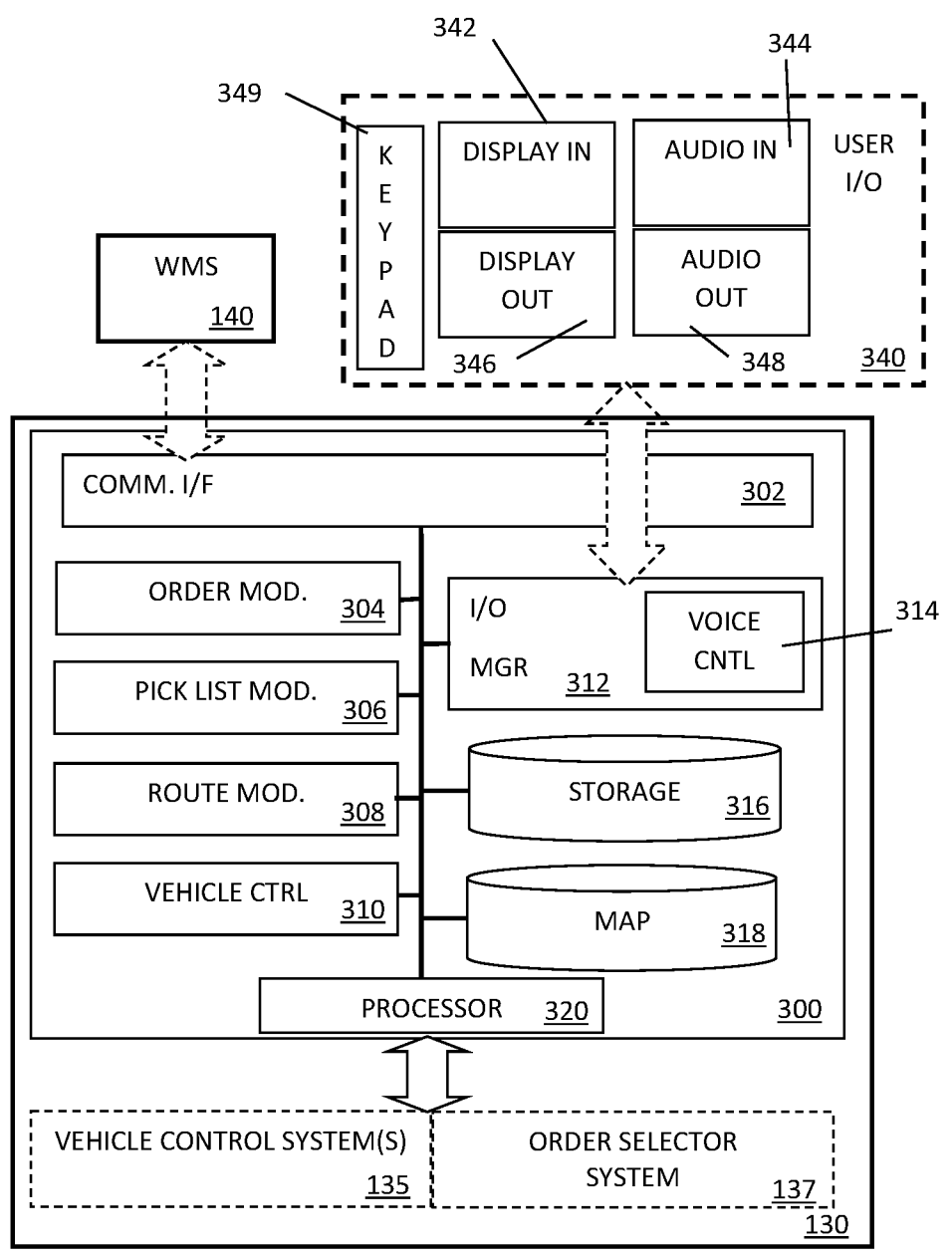
FIG. 3 is a block diagram of an embodiment of robotic vehicle modules that enable case picking, in accordance with aspects of the present invention.

FIG. 3 is a block diagram of an embodiment of a robotic vehicle 130 and various robotic vehicle modules 300 that can be used to enable case picking, in accordance with aspects of the disclosure. Those skilled in the art will appreciate that in this embodiment, the functions of modules 300 could be provided in modules other than those shown in FIG. 3. As an example, modules 300 can take the form of computer program code stored in a non-transitory storage media 316 and executed by at least one processor 320. Those skilled in the art will further appreciate that the various modules and/or functions 300 could be differently distributed across different processing devices, and the present invention is not limit by the particular distribution of such modules and/or functions shown in FIG. 3.

FIG. 3 also shows an embodiment of a user device 340 that serves as a device that enables a user (e.g., order selector) to interact with the robotic vehicle, e.g., to provide inputs. The user device 340 can be part of, or onboard, robotic vehicle 130 or it can be a separate device, or some combination thereof. For example, user device 340 could be part of a control system on robotic vehicle 130 or it could be a handheld wireless device.

In some embodiments, the user device 340 is worn on a user. For example, in some embodiments, the user device 340 is worn on the user's head. In some embodiments, the user device 340 is worn on the user's arm. In some embodiments, the user device 340 is worn on the user's wrist. In some embodiments, the user device 340 is worn on the user's hand.

In some embodiments, the user device 340 could be a device stationed in a zone or aisle or at a pick face. In other embodiments, the user device 340 could be distributed across two or more of the robotic vehicles, a handheld device, a stationary device in a zone or aisle or at a pick face, and a storage facility management system.

In some embodiments, the user device 340 comprises a communication module 302. In some embodiments, the communication module 302 enables communication between the robotic vehicle 130 and external systems, such as a storage facility management system 140 (e.g., a warehouse management system WMS 140), third party systems, remote service, and/or the user device 340. The communication between these different systems, subsystems, and/or entities will be as described herein, but could be different in other embodiments. Communication module 302 can enable one or more known or hereafter developed types of communication, whether wired or wireless, and implement the necessary protocols and message formats associated therewith. Such types of communication can include, but are not limited to, Ethernet, Bluetooth, wireless modem/router, high speed wire, radio frequency, and so on.

In some embodiments, the user device 340 comprises an order module 304. In some embodiments, the order module 304 can be used to receive an order from WMS 140 or user device 340. That is, in some embodiments, WMS 140 can receive an order from an external source, e.g., over the Internet, intranet, extranet, virtual private network (VPN), and so on, and communicate the order to robotic vehicle modules 300 via communication module 302. Otherwise, the order module 304 could receive an order from a non-transitory memory, such as a Flash drive, CD ROM, or similar storage device.

In some embodiments, user device 340 could be used to transmit an order to robotic vehicle modules 300, via communication module 302. In FIG. 3, various input and output mechanisms are shown for a user device 340. These include a keypad or keyboard 349, input display (e.g., touch screen) 342, and a voice input (e.g., microphone) 344, in this embodiment. User device 340 could be a cell phone, personal digital assistant, or similar network enabled, handheld device, as examples. The display can be any type of wired or wireless display. In some embodiments, the user device 340 does not include an input and/or output mechanism.

Those skilled in the art will appreciate that the user device need not include all of the modules and/or components depicted in FIG. 3. In other embodiments, the user device could include a subset of the shown modules and components, a different set of modules and components, or a combination thereof. As an example, in some embodiments, the user device 340 can comprise one or more cameras, sensors, or the like. In some embodiments, the user device 340 can comprise one or more inertial measurement units.

When an order is received, or otherwise electronically stored at the robotic vehicle modules 300, a pick list module 306 can process the order to generate a pick list. A pick list, therefore, is a list of items to be picked in the warehouse to fill at least one order. In addition to the order, the pick list module 306 can generate the pick list using various types of information, such as product inventory. The pick list could also be generated using information relating to pick zones associated with products, and pick faces within pick zones where the products physically reside. Alternatively, a user may specify a pick list manually, e.g., via an interface on or off the robotic vehicle, such as the user interactive screens shown in FIGS. 4A-4B. This information can be stored in storage device 316, or be made available from WMS 140. In some embodiments, the WMS 140 or other external system can provide a realized pick list, obviating the need for module 306.

With a pick list generated, a route module 308 can be used to generate a route through the warehouse to be followed by robotic vehicle 130, as the robotic vehicle works its way through the warehouse to gather the products. In addition to the pick list, route module 308 can generate the route using various types of information, such as an electronic map 318 representing the warehouse, including pick zones and pick faces within pick zones. In some embodiments, the electronic map 318 is located at the robotic vehicle 130. In other embodiments the electronic map 318 is located at the WMS 140, or at one or more other systems that communicate with WMS 140 and/or robotic vehicle 130. In some embodiments, the electronic map 318 may reside at user device 340. In those embodiments in which the electronic map 318 is not at the robotic vehicle 130, route information is communicated to the robotic vehicle 130.

As will be appreciated by those skilled in the art, the route module may include functionality to optimize the route based on minimizing distance travelled, minimizing congestion (in view of routes of other robotic vehicles), minimizing time, the known or estimated location of manually operated equipment, and/or order stacking considerations (e.g., heaviest items on bottom), as examples. The route can be stored in storage device 316, or made available from WMS 140.

While order module 304, pick list module 306, route module 308, the non-transitory storage media 316, and the at least one processor 320 are shown as part of robotic vehicle 130, in other embodiments one or more of the foregoing could reside at the WMS 140, or at one or more other systems that communicate with WMS 140 and/or robotic vehicle 130. In some embodiments, one or more of these modules may reside at user device 340.

Vehicle control system 135 is that system that generally causes robotic vehicle 130 to travel through the facility. It can receive instructions, and automatically route itself to a destination within a facility, e.g. a warehouse. Robotic vehicles can use electronic maps, markers, vision systems, and so on for guidance. However, typical robotic vehicles have no ability to iterate themselves through an environment (e.g., a facility), e.g., pausing or stopping at pick locations as described.

Vehicle control module 310 communicates with vehicle control system 135 to achieve an iterative robotic navigation through an environment, in this case warehouse 100. Vehicle control system 310 can use the route created by route module 308, which includes the pick zone and pick face information necessary to fill the initial order. As will be described in greater detail, vehicle control module 310 can cause vehicle control system 135 to robotically navigate to a pick face within a pick zone.

In some embodiments, the robotic vehicle 130 comprises an input/output (I/O) manager 312. In some embodiments, the input/output (I/O) manager 312 resides at the WMS 140, or at one or more other systems that communicate with WMS 140 and/or robotic vehicle 130. In some embodiments, the input/output manager 312 may reside at user device 340.

In some embodiments, the input/output manager 312 communicates the picking information to an order selector, e.g., that could ride on, walk-beside, follow, or meet the robotic vehicle, or may be stationed at a zone or pick face. The input/output manager 312 may include a voice controller 314. Display in module 342 and display out module 346 could be the same device, such as a touch screen. The output at the user device 340 could take the form of screens, and/or audio output via audio out module 348. The output could also include the output of light patterns, symbols, or other graphical or visual effects. In some embodiments, the output at the user device 340 takes the form of an augmented reality device including, but not limited to, HoloLens and/or Glass. In some embodiments, the output at the user device 340 takes the form of a voice only device, such as a Vocollect belt pack and headset.

Once the items are picked, the user, by operating a user device, such as user device 340, can indicate such to the robotic vehicle 130, via I/O manager 312. For example, a user could simply say "Go" or "Next," via audio in module 344, and vehicle control module 310 could cause the vehicle control system to navigate to the next stop in the route. Additionally, or alternatively, the user may be allowed to use a keypad 349 or touch screen (display in module 342) entry to accomplish the same action.

In an alternative embodiment, the vehicle 130 includes sensors to track the weight of the goods loaded, and determine when the pick is complete based on the known weight of each case and the observed change in load weight.

In some embodiments, the robotic vehicle 130 comprises one or more sensors configured to detect a user's gestures and/or gaze. In such embodiments, the user could use a change in gesture and/or gaze to instruct the robotic vehicle 130 to move to the next location.

In some embodiments, the user device 340 comprises one or more sensors configured to detect a user's gestures and/or gaze. In such embodiments, the user could use a change in gesture and/or gaze to instruct the robotic vehicle 130 to move to the next location.

In some embodiments, the robotic vehicle 130 measures the weight of an item loaded on the robotic vehicle 130. In such embodiments, the robotic vehicle 130 compares the weight measured with predetermined weight information for that item. If the measured weight matches the predetermined weight, the robotic vehicle 130 determines that the item has been loaded. In some embodiments, the robotic vehicle 130 compares the items loaded to the pick list to determine when it is appropriate to move to the next location.

In some embodiments, the robotic vehicle 130 measures the weight of an item loaded on the robotic vehicle 130. In such embodiments, the robotic vehicle 130 compares the weight measured with predetermined weight information for that location. If the measured weight matches the predetermined weight, the robotic vehicle 130 determines that the it is appropriate to move to the next location.

Figures 4A, 4B:
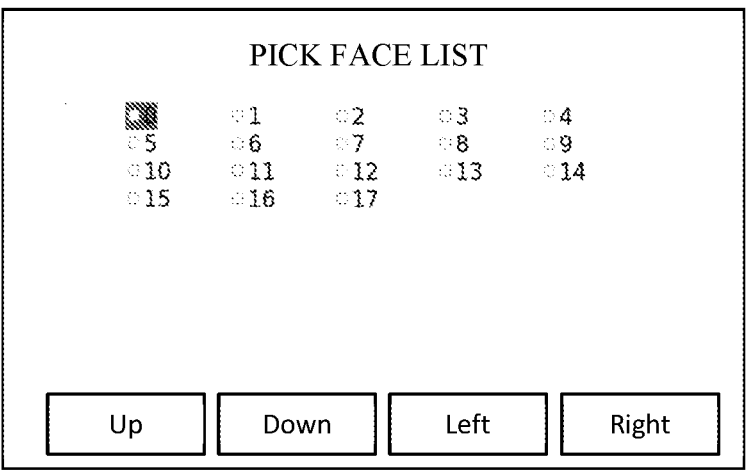
FIGS. 4A and 4B are front views of an embodiment of pick face list displays, in accordance with aspects of the present invention.

In the embodiments of FIGS. 4A and 4B, an approach to manually creating a pick list by hand is shown. Here, Up, Down, Left, and Right keys are provided to enable a user to choose specific pick faces to be included in a pick list, which can be displayed via display out module 346. Each pick face number represents a different pick face—where selection of a pick face adds the pick face to the pick list.

Pick lists can be created in other ways in other embodiments. For example, an order could be entered and a pick list could be automatically generated. The present disclosure is not limited to the manual approach of FIGS. 4A and 4B, nor is it limited to those screens or functionality.

Figure 5:
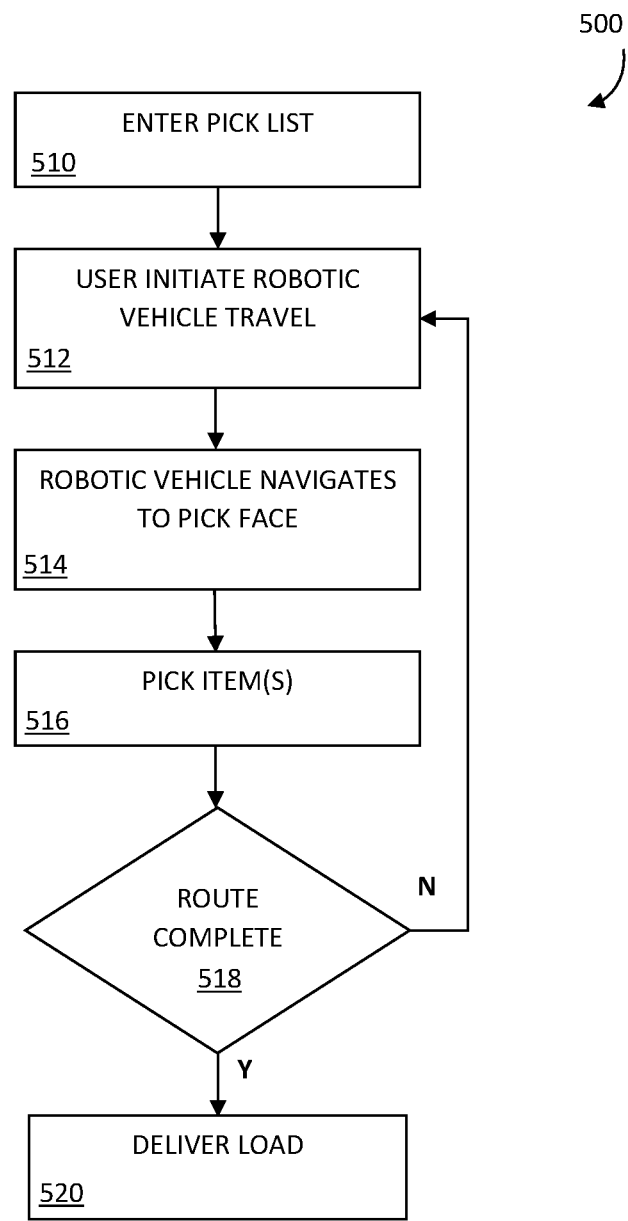
FIG. 5 is a flowchart depicting an embodiment of a method of picking cases with robotic vehicle assistance, in accordance with aspects of the present invention.

FIG. 5 is a flowchart depicting an embodiment of a method 500 of picking cases with robotic vehicle assistance, in accordance with aspects of the present disclosure. This method can be carried out by the robotic vehicle modules 300 of FIG. 3, or similar systems. Method 500 can take at least the following two forms:

Follow-Model with Button—Demonstrates the ability for a worker (i.e., user or order selector) to team with a robotic vehicle to travel a warehouse and pick an order without getting on or off a pallet jack. The order selector can direct or control the flow of the robotic vehicle.

Follow-Model with Voice Option—Complete hands-free operation of a robotic vehicle to partner with an order selector to pick cases can be provided. Here the order selector can be freed from hands-on interaction with the robotic vehicle. The order selector uses a voice system to command the robot start/stop/slow down. The order selector directs or controls the flow of the robotic vehicle and the voice system tells the order selector what to do. In other embodiments, the order selector could interact with the robotic vehicle using gestures, e.g. hand signals.

As shown in FIG. 5, a pick list can be entered into the robotic vehicle in step 510, and the order selector can initiate robotic vehicle travel to a first pick face in step 512. Robotic travel can be initiated by voice, gesture, button or other user interactive mechanism. In step 514, the robotic vehicle navigates to the pick face. In step 516, the order selector picks the products from the pick face. If the route is complete, step 518, the picked load is delivered, in step 520. The load could be delivered to a shipping and receiving area, a zone in the warehouse, or some other designated location. If the route was not complete in step 518, the method returns to step 512, where the user initiates robotic travel to the next pick face, or the robotic vehicle could be dispensed to a next location, e.g., next pick face or loading area, through an onboard or external control signal.

Figure 6:
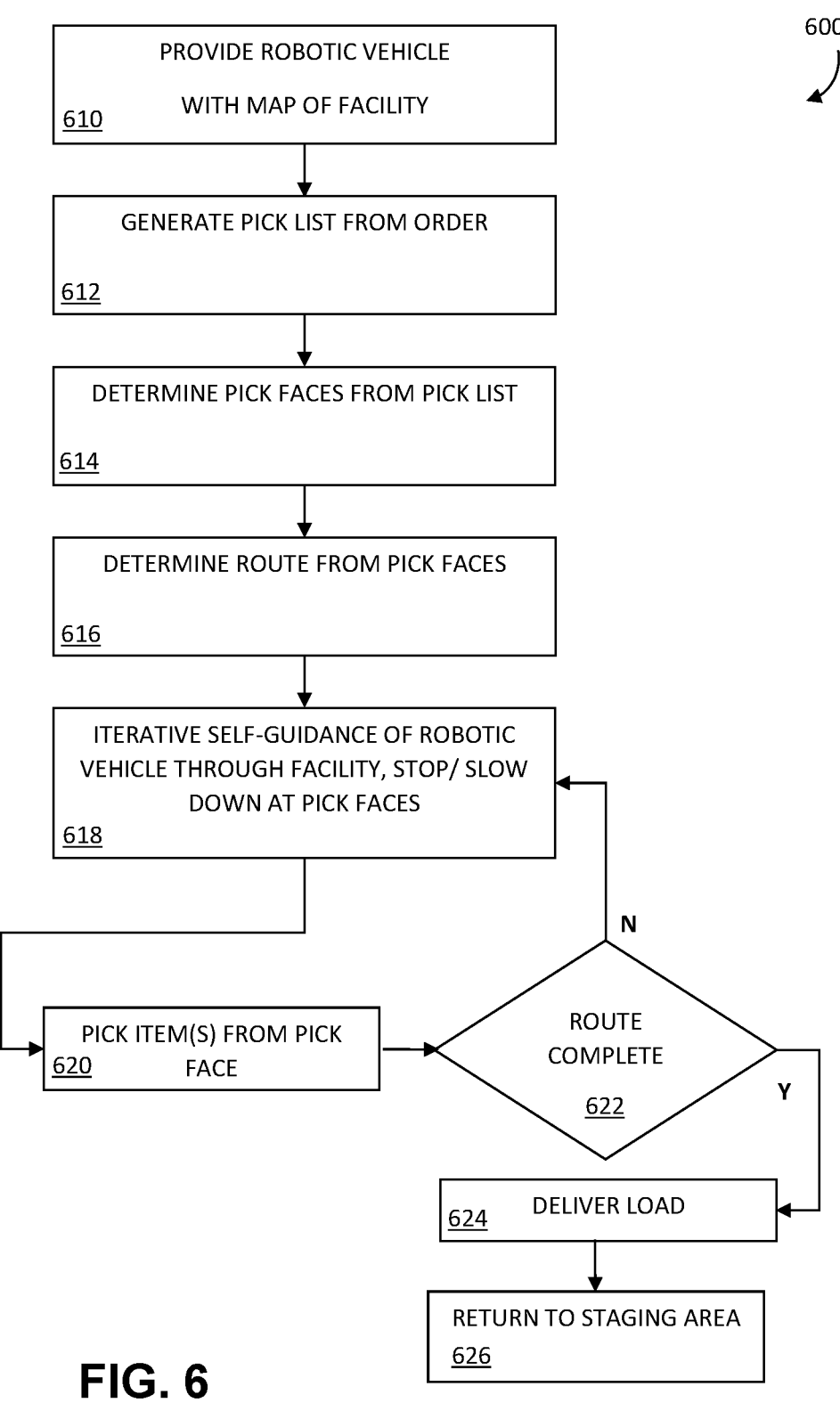
FIG. 6 is a flowchart depicting an embodiment of a method of picking cases, in accordance with aspects of the present invention.

FIG. 6 is a flowchart depicting an embodiment of a method 600 of picking cases, in accordance with aspects of the present invention. This method can be carried out by the robotic vehicle modules 300 of FIG. 3, or similar systems. Method 600 can take at least the following two forms:

Auto-Location Case Picking—A pre-programmed map of the warehouse sets up each location as a distance grid and can be set as a pause or slow down location for the robotic vehicle. For each order, stops or slow downs are "Selected" based on the location of the product on that order. The robotic vehicle travels through the warehouse in a pre-determined path, stopping or slowing where the order needs product. The order selector walks along with the robotic vehicle and the system tells him when to pick and what to pick. A command will tell the robotic vehicle to go to the next location. In some embodiments, the robotic vehicle 130 will slow down, cruise pass the pick face, then stop just past it, if and only if the user had not completed the pick by then. This allows picking of a small number of items without stopping, but ensures the robot does not run away when there is a large order. An extension of this could be to decide pre-emptively to stop right at the pick face when more than X items are to be picked.

WMS-Directed Location Case Picking—An order will be sent to a robotic vehicle from the WMS 140. Based on the locations in that order, the robotic vehicle will travel a "Smart Path" that is created based on the order stops or slow-downs. The robotic vehicle will travel to each location and stop or slow down for work. This creates the flexibility to have the order selectors follow the robotic vehicle or wait in pre-assigned zones for the robotic vehicles to arrive for work, or be dynamically dispatched to successive pick faces by a centralized system, e.g., WMS 140.

As shown in FIG. 6, a robotic vehicle can be provided with a map representing the warehouse, in step 610. In step 612, a pick list is generated from an order. The pick list can be manually generated, computer generated, or some combination thereof. Pick faces are determined in step 614, and a route can be determined from the pick faces, in step 616. Step 618 begins iterative guidance through the warehouse. In step 618, navigation can be initiated by the user with a command input to the robotic vehicle. The robotic vehicle navigates to the next pick face based on the route and map.

In step 620, product is picked from the pick face, and loaded on the robotic vehicle, e.g., a pallet transport or tugger with cart. If, in step 622, the route is complete, the load can be delivered, in step 624, as described above. But if the route is not complete, the process returns to step 618 for robotic navigation to the next pick face. After the load is delivered the robotic vehicle can navigate to a staging area, in step 626.

Figure 7:
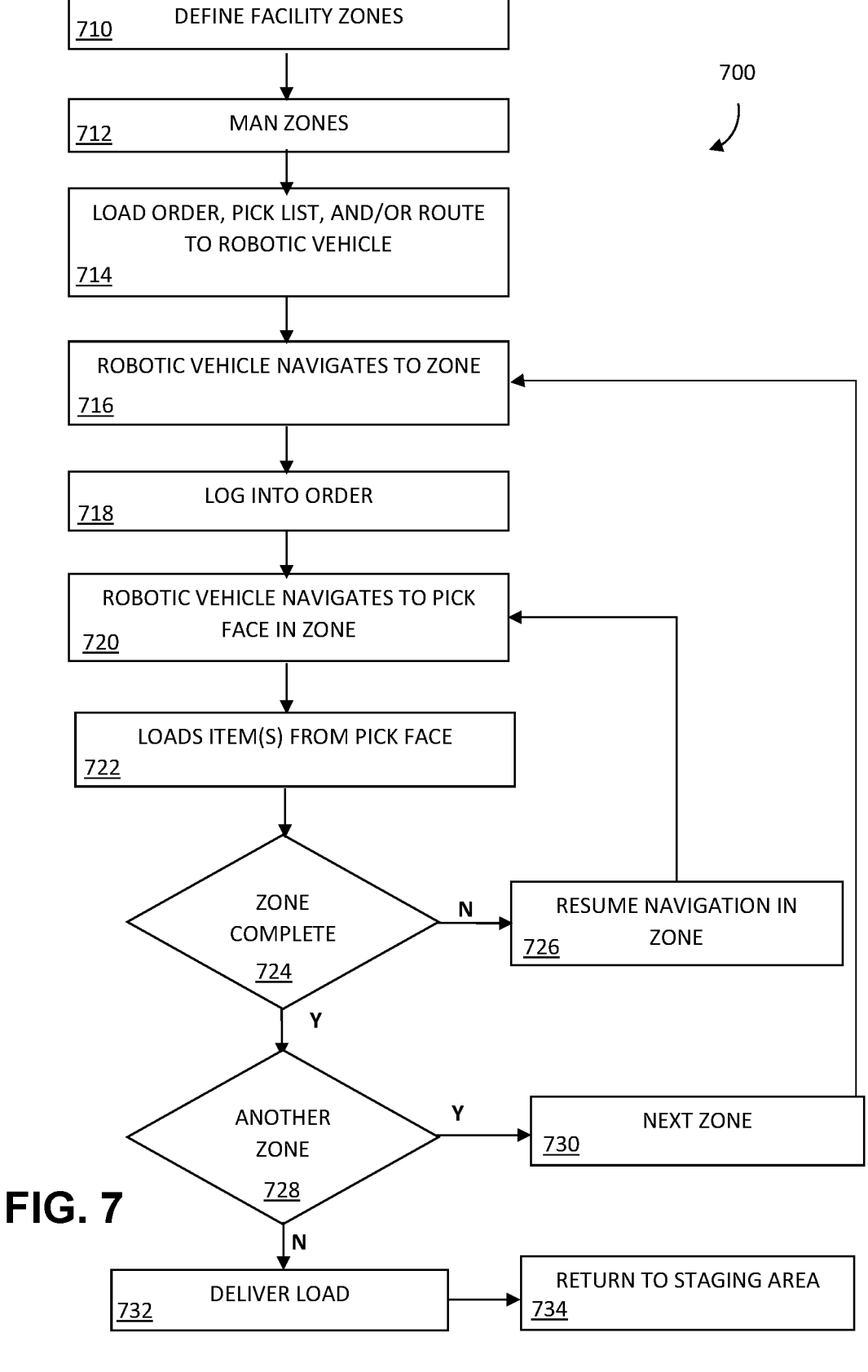
FIG. 7 is a flowchart depicting an embodiment of a method of picking cases using zones and robotic vehicle assistance, in accordance with aspects of the present invention.

FIG. 7 is a flowchart depicting an embodiment of a method 700 of picking cases using zones and robotic vehicle assistance, in accordance with aspects of the present invention. This method can be carried out by the robotic vehicle modules 300 of FIG. 3, or similar systems. Method 700 can take at least the following form:

Zone Case Picking—The order selectors are assigned to strategic zones ("pick zones") that are dynamic enough to be changed in order to balance productivity/capacity of the order selectors and the capacity/utilization of the robotic vehicles. In some embodiments, cases/hour rates can be set per zone to minimize the amount of travel for different zones/order selectors based on density for a certain area. The robotic vehicle will allow an Ops Manager to set the zones for the day/time-period and the robotic vehicles based on the volume for the day. The WMS 140 can assign orders to the robotic vehicles (or an operator can scan in an order when pallets are loaded on the robotic vehicle) and the order locations will be used to direct the robotic vehicle where it needs to go. In some embodiments, robotic vehicle modules 300 will optimize the path decision for the robotic vehicle to get from location to location, as described herein. The order selector can interact with each robotic vehicle that arrives in a zone by logging into the "Robot Order" or an auto-logon based on the zone the robotic vehicle is in, so that the order selector can be directed via a voice or other signal to pick a number of cases from the pick faces in that zone. The robotic vehicle can be directed via a voice signal or other signal to move onto the next zone. For example, such signals could include a physical human gesture, a hands-on or remote order selector input, or some other signal.

As shown in FIG. 7, zones are defined within the warehouse 100, in step 710, and the zones are staffed with order selectors in step 712. In step 714, an order, pick list and/or route are loaded into the robotic vehicle. In step 716, the robotic vehicle navigates to a zone. An order selector logs into an order, in step 718, either directly at the robotic vehicle or through an electronic device that communicates with the robotic vehicle either directly or through the WMS 140. In step 720, the robotic vehicle navigates to the first pick face in the zone. The order selector loads the items in step 722. If picking within the zone is not complete, in step 724, the robotic vehicle navigates to the next pick face within the same zone, in step 726.

If, in step 724, picking in the zone is complete, a determination is made of whether or not there is a next zone, in step 728. If so, the robotic vehicle goes to a next zone in step 730. If not, the robotic vehicle delivers the load, in step 732. After the load is delivered, the robotic vehicle could go to a staging area, as in step 734. For example, the robotic vehicle could go to a shipping and receiving area, as an example, if the order is complete. In some embodiments, after the load is delivered, the robotic vehicle could receive another order, pick list, and/or route.

In various embodiments described herein, the robotic vehicle has one or more of the order, pick list and route locally stored. But in other embodiments, one or more of the foregoing could be externally stored, e.g., at the WMS, and communicated to the robotic vehicle as needed—perhaps just in time. For example, when an order selector loads product from a pick face and is ready to initiate robot self-navigation to a next location, a voice or other input could cause the robotic vehicle to receive the next pick face location from the WMS or other external system.

In accordance with aspects of the present invention, a variety of case picking solutions are possible by including a robot control system in facility equipment, such as pallet transports, forklift, highlifts, and tuggers, to form a robotic vehicle. The resulting flexibility can be enhanced by interfacing the robotic vehicle with a storage facility management system to maximize the utilization of robotic vehicles to support a combination of factors that are important, in varying degrees, to each customer/facility. Balancing cases/hour with the labor costs and orders/hour may have different implications for efficiency and impact other areas, like put-away and shipping. There is great value in letting each facility balance its own people, processes and robots to achieve its own goals.

At the same time, the robot control system is flexible enough to integrate with other technology in use at the warehouse. The robots take direction from the WMS order, e.g., as orders are printed for the pickers, can follow an optimal path, and can display what to pick for the worker on a screen mounted on the robot. The robots can arrive at a zone and the worker can read the screen for what to pick. Additionally, or alternatively, the voice system can tell the worker what to pick. No matter the infrastructure and goals for that day and for that warehouse, the robot control system can be tuned on the fly to support the needs in real-time. For instance, a warehouse can use label picking in perishables, voice in dry goods, and/or RF display in bulk, as examples. The robots can travel from location to location and the workers can be prompted via the method they are using.

In various embodiments, dynamic allocation and coordination of auto-navigating vehicles can be a human-robot hybrid approach or a robot-robot approach to the problem of case (and possibly each) picking. Picking is the act of assembling an ordered group of goods from a warehouse in preparation for dispatching it to the customer. The type of picking referred to the above embodiments is case picking, where the goods being picked are grouped in cases (e.g. a grocery warehouse, where the individual picks might be a case of 24 cans of soup, a large bag of dog food, etc.), and assembled on a pallet for later transport. Dynamic allocation and coordination of auto-navigating vehicles can also apply to each picking, where smaller orders of individual items are gathered, such as customer orders from Amazon. This discussion will be framed in terms of case picking, but dynamic allocation and coordination of auto-navigating vehicles would be applicable in both scenarios in various embodiments.

In traditional case picking, each selector (e.g., a human) is given a pick list of cases that will make up a single outgoing pallet, generally sorted by aisle or by the order they need to go on the pallet (if particularly heavy or crushable cases are involved). They drive a powered pallet truck through the warehouse, incrementally assembling the pallet. Once complete, they take the pallet to the docks, get a new pick list, and repeat. There are a variety of inefficiencies in this approach, but the most significant is travel time: on average, selectors spend 40-50% of their time simply moving from one pick location to the next. While many warehouses organize popular products into a compact area, there are nearly always a number of rarer items that require long trips to acquire.

An alternative approach is zone picking, where the selectors remain (mostly) stationary near a zone of one (or multiple) bays of goods, picking cases onto a conveyor belt or other such mechanism. This eliminates long travel distances, but has a number of other challenges. If each selector is responsible for a small zone, they don't need to move very far between picks, but risk being idle when nothing from their locations is needed. Increasing the zone size reduces idle time, but increases walking time as they move back and forth. In addition, the upfront costs of the conveyor belts or other conveyance system are significant.

In various embodiments, dynamic allocation and coordination of auto-navigating vehicles uses robotic pallet jacks and centrally dispatched roaming order selectors to create a significantly more efficient, yet flexible, approach to picking. A dynamic allocation and coordination of auto-navigating vehicles system receives the pick lists from the warehouse's inventory system (e.g. a WMS, WES, etc.). As pick lists arrive, they are each assigned to an autonomous pallet jack, which then moves through the warehouse, akin to the manual selectors in traditional case picking, but without a human. When each robot reaches its next pick location, it comes to a stop and waits for a human to pick the case. Humans are independently directed by the system, which makes decisions about their next picks in real time. A number of factors are taken into account, including travel time for the human, estimated time of arrival to the next pick for each robot, potential sources of congestion, etc. This allows humans to be directed to a string of picks, often across many robots, without being tied to a specific zone of the warehouse: a selector will move in a random walk through the entire warehouse over the course of a shift. By using more robots than humans, the system is able to artificially increase the pick density of slow-moving portions of the warehouse, as it can wait to send any humans until a critical mass of robots are in the area. Combined with computer-based methods to minimize human travel time, picking efficiency can be greatly increased: in at least some environments, selector staffing can be halved.

Figure 8:
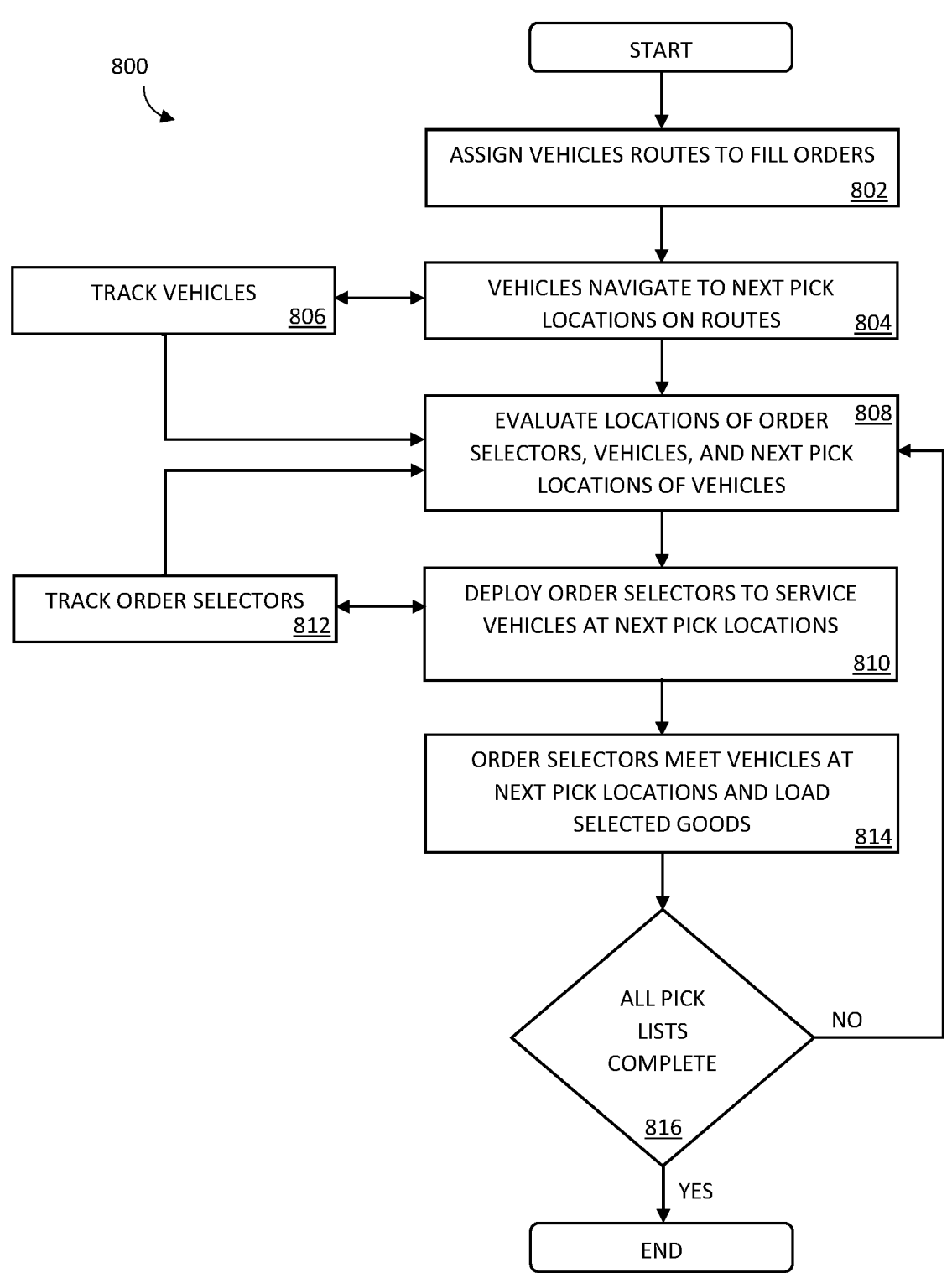
FIG. 8 is a flowchart depicting an embodiment of a method of dynamic allocation and coordination of auto-navigating vehicles where order selectors are dynamically deployed to pick locations, in accordance with aspects of the present invention.

FIG. 8 is a flowchart depicting an embodiment of a method 800 of picking cases using dynamic allocation and coordination of auto-navigating vehicles where order selectors are dynamically deployed to pick locations, in accordance with aspects of the present invention. In various embodiments, the assignment and movement of order selectors and robot vehicles to pick locations happens in parallel: an order selector can (and often will) begin moving to a pick location before the robotic vehicle has arrived.

Figure 9:
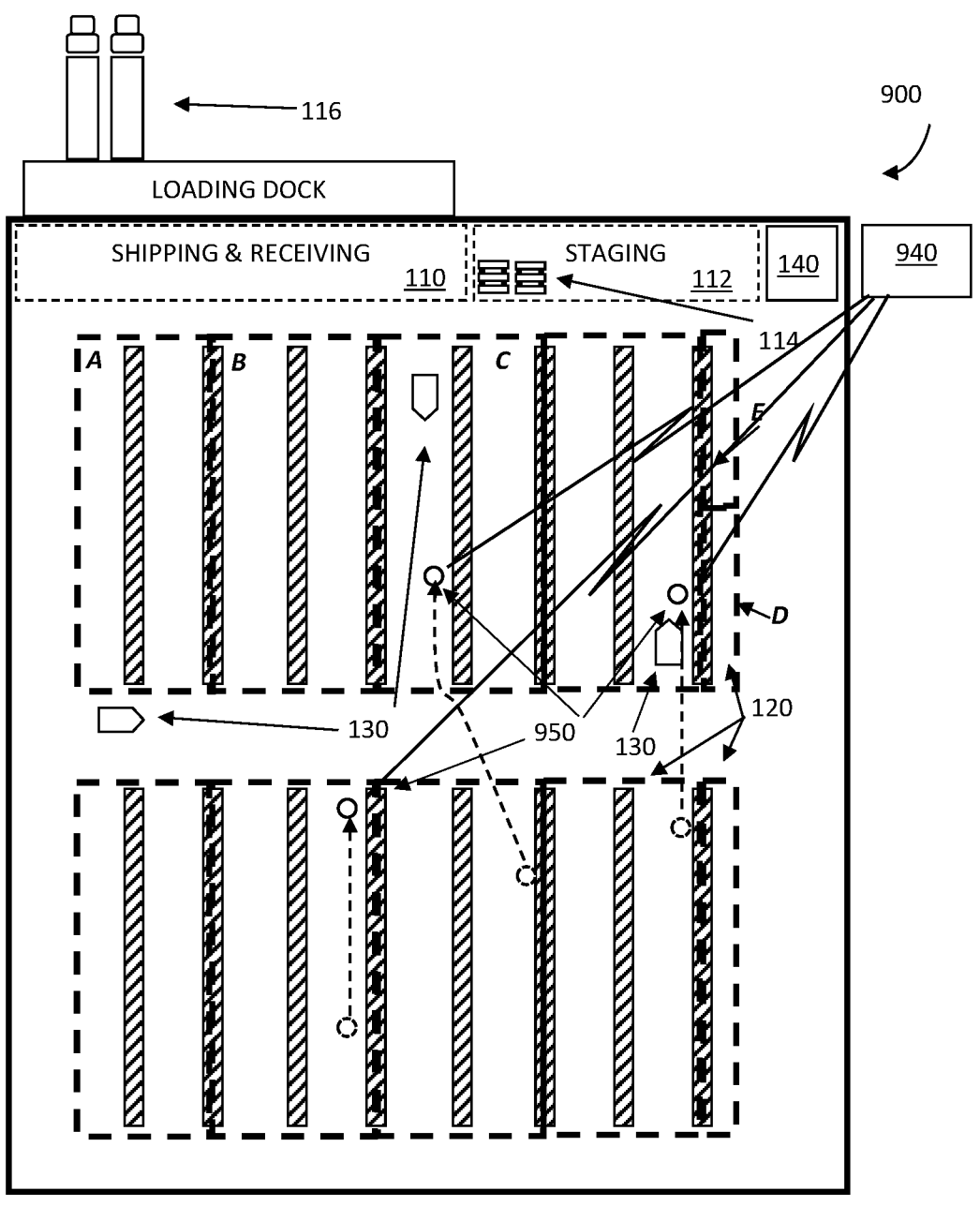
FIG. 9 is a diagram of a warehouse that comprising a system and a method for the dynamic allocation and coordination of auto-navigating vehicles, in accordance with aspects of the present invention.

FIG. 9 is a diagram of a warehouse 900 comprising a dynamic allocation and coordination of auto-navigating vehicles system 940 implementing the method 800, in accordance with aspects of the present invention.

In various embodiments, a plurality of vehicles 130 are deployed to various pick faces where goods are selected and loaded on the vehicles to fill orders. Order selectors 950 are also deployed to meet the vehicles 130 at the pick faces to select the goods and load the goods on the vehicles. After such "picking," the order selectors 950 can be dynamically redeployed to their next pick faces to select and load goods on the same or different vehicles. That is, in various embodiments, order selectors 950 are not dedicated to a particular pick location or vehicle 130. Rather, order selectors 950 are deployed based on analysis of locations of the order selectors 950 and next pick face locations of the vehicles 130. Additionally, or alternatively, in some embodiments, the order selectors 950 are deployed based on analysis of locations of the order selectors 950 and future pick face locations of the vehicles 130. A dynamic allocation and coordination of auto-navigating vehicles system 940 is in communication with the order selectors 950, and can perform the analysis and orchestrate the deployment and redeployment of the order selectors 950, e.g., in real or near-real time. The communication with the order selectors 950 is preferably wireless, using any now known or hereafter developed wireless communication technology. The result is a highly efficient order selection process that minimizes the idle time of order selectors.

Figure 1:
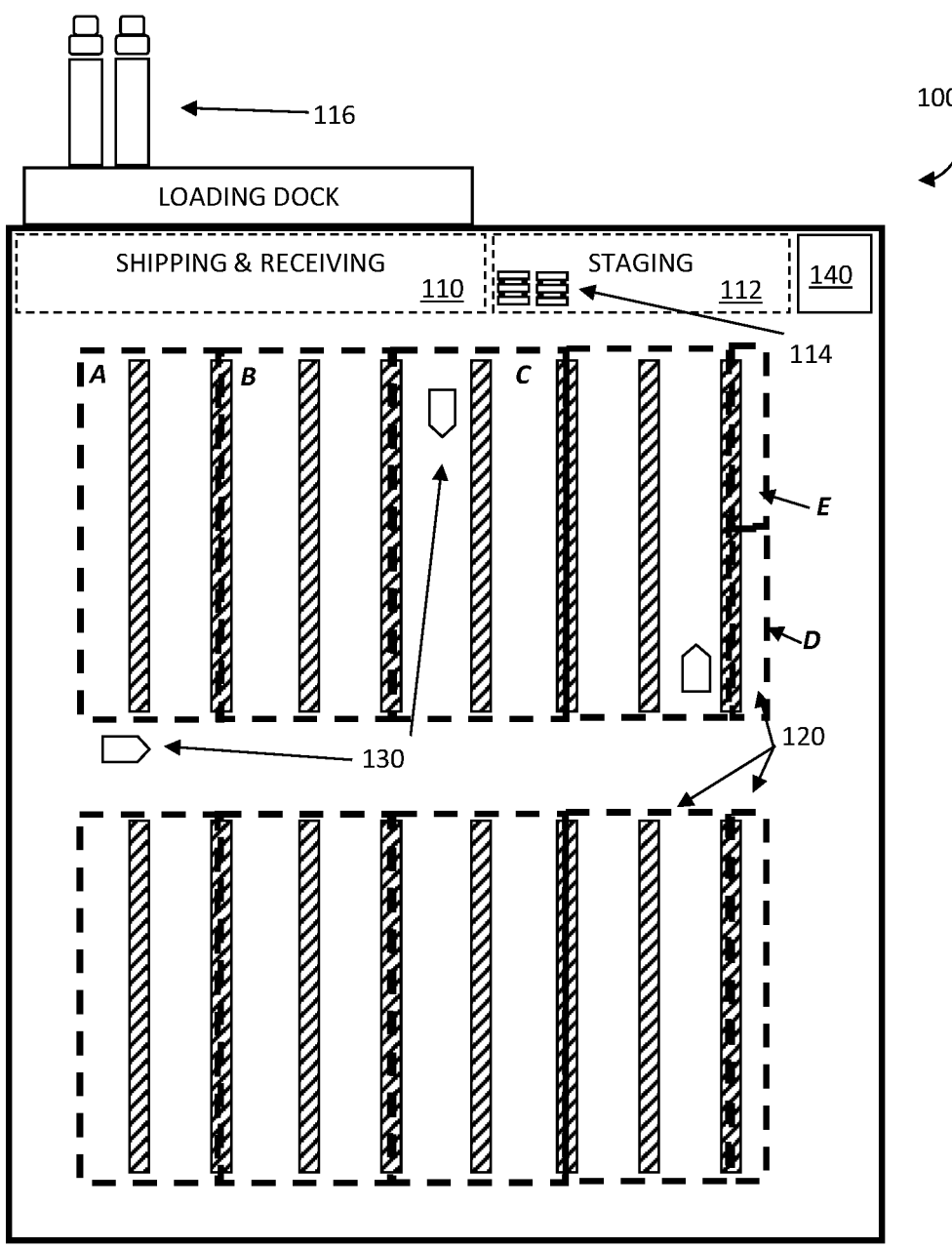
FIG. 1 is a block diagram of a simplified warehouse.
Figure 2:
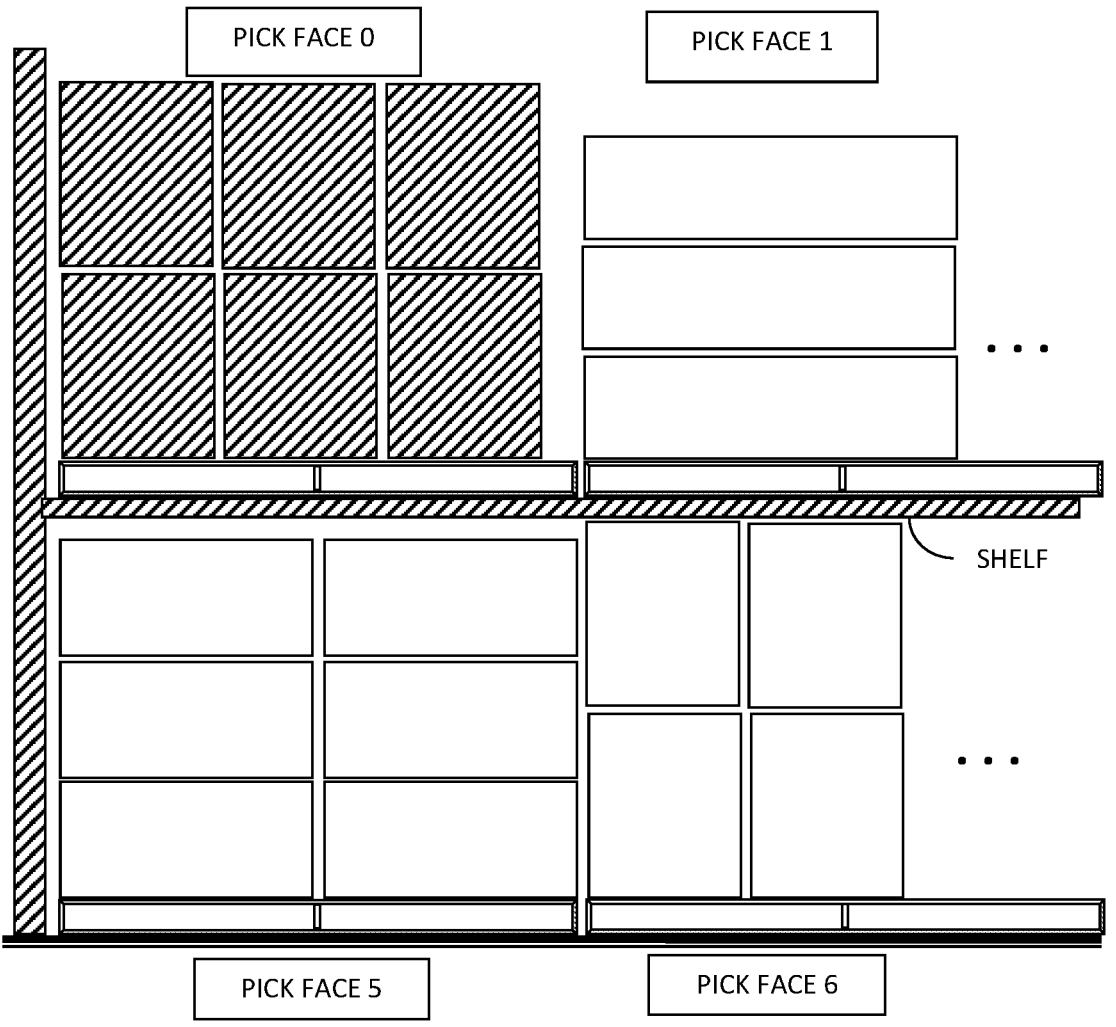
FIG. 2 is a block diagram of a front view of an aisle and pick faces.

In various embodiments, the system 940 can be located within the warehouse 900 or external to the warehouse. Warehouse 900 can be similar to warehouse 100 of FIG. 1. In various embodiments, the system 940 can form part of the warehouse management system 140. In various embodiments, the vehicles 130 can be automated vehicles, semi-automated vehicles, manned vehicles, and/or combinations of two or more thereof. In various embodiments, the order selectors 950 can be automated vehicles, semiautomated vehicles, a human selector having a handheld device, and/or combinations of two or more thereof. In some embodiments, the order selectors 950 use a transport mechanism, such as, but not limited to, a scooter, a powered vehicle, etc.

The communication from the system 940 to the order selectors 950 can take the form of an electronic message received and processed by a processor of the order selectors 950. The electronic communication can include data and/or information identifying the next pick face for the order selector. The data and/or information can identify the pick face, an identification of the good or goods to be picked, and/or a quantity of each good to be picked. In some embodiments, the electronic communication can include data and/or information that identifies the robotic vehicle 130 associated with the goods to be picked. In some embodiments, the data and/or information can include navigation instructions to assist the order selector in navigating to the next pick face location. In the case of an automated or semiautomated order selector (or order selector vehicle), the communication can be automatically processed by the order selector to facilitate navigation to the next pick face location and picking of the appropriate goods.

In some embodiments, a human order selector can be equipped with a handheld or mobile device (collectively "order selector" or "order selector device") that includes an order selector application configured to process the communication. The order selector application can interface with a navigation program and process the received communication to cause the device to output navigation instructions for proceeding to the next pick face location. The navigation instructions can be output as text, a dynamically updated map of the facility, and/or audio. That is, navigation instructions and outputs can be provided within the context of a map or other representation of the warehouse facility. The application can process the received communication to display images of the goods to be picked at the pick face, text, and/or output information identifying the goods to be picked. In some embodiments, the order selector application can include or interface with an application configured to read codes from packaging or labeling of the goods, e.g., a bar code scanner and/or QR code reader.

In some embodiments, the order selector can include one or more user interface devices, including at least one pick-complete device that, when actuated, generates a pick-complete signal indicating that loading of products from a pick location to the robotic vehicle has been completed and the robotic vehicle is clear to proceed to a new next pick location on its route. For example, an order selector application on an order selector device can be configured to electronically communicate the pick-complete signal to the robotic vehicle 130, WMS 140, and/or the system 940.

Referring to the illustrative method 800 of FIG. 8, which can be accomplished by the system 940 of FIG. 9, the process begins with assigning robotic vehicles to routes to fill orders in step 802, which can be accomplished by WMS 140. In step 804, the robotic vehicles navigate to next pick locations on their respective routes. Movement of the vehicles can be tracked, in step 806, e.g., by WMS 140 or another tracking system, such as known tracking systems.

In step 808, locations of order selectors 950, vehicles 130, and next pick locations of vehicles 130 are evaluated, e.g., by the system 940. In step 812 locations of the orders selectors 950 can be tracked. Based on efficiency analysis by the system 940, next pick faces for the order selectors are determined and the system 940 communicates a message to the order selectors to deploy to service vehicles 950 at next pick locations, in step 810. In various embodiments, the order selectors movement occurs in parallel with robot motion, and order selectors may be reassigned at any time.

The order selectors 950 meet vehicles 130 at next pick locations and load selected goods, in step 814. This step can include the order selectors communicating to the robotic vehicle 103, WMS 140, and/or the system 940 that the pick is complete and the robotic vehicle 130 is free to navigate to its next pick face location and the order selector is free to be assigned to a next pick face location of the same or another robotic vehicle. Translation of the order selectors 950 from one pick location to the next is depicted by dashed arrows in FIG. 9. If fulfillment of all pick lists for each vehicle 130 is complete, in step 816, the process can terminate. Otherwise, the process returns to step 808 to continue to orchestrate deployment of order selectors 950 to select and load goods from pick faces onto vehicles 130.

The analysis performed by the system 940 to efficiently deploy and redeploy the order selectors can take one or more various forms, e.g., shortest routes, quickest routes, and so on, as described above.

In some embodiments, the analysis performed by the system 940 to efficiently deploy and redeploy the order selectors takes into account the fatigue level of at least one or the order selectors. In some embodiments, the analysis performed by the system 940 to efficiently deploy and redeploy the order selectors is configured to maximize warehouse throughput. In some embodiments, the analysis performed by the system 940 to efficiently deploy and redeploy the order selectors is configured to meet order shipment deadlines. In some embodiments, the analysis performed by the system 940 to efficiently deploy and redeploy the order selectors is configured to maintain a maximum delay limit per order (e.g. complete each order within a certain period after submission of the order). In some embodiments, the analysis performed by the system 940 to efficiently deploy and redeploy the order selectors is configured to smooth facility output across the shift.

Beyond the broad strokes of dynamic allocation and coordination of auto-navigating vehicles discussed above, there are a number of incremental improvements that can be implemented within the system 940 to further increase picking efficiency. Allowing the robots to coast past the pick location, and stop just past it, allows small numbers of cases to be picked onto the (slowly) moving robot, enabling it to speed back up without stopping after the pick is complete. Using a double pallet jack and assigning two pick lists to each robot will also increase overall pick density. This has been done with manual selection, but results in a significant number of cases placed on the wrong pallet: doing so effectively requires integration with the equipment to indicate which pallet is being picked to at a given time, a natural extension of dynamic allocation and coordination of auto-navigating vehicles. Introducing another travel method for the selectors, such as industrial scooters, further boosts their efficiency.

Future improvements in the assignment algorithm can be used to reduce the need for faster selector travel, however. Finally, once the dynamic allocation and coordination of auto-navigating vehicles within the space has been more thoroughly explored, the goods in a warehouse could be re-slotted (rearranged) to optimize the locations of goods around the strengths of the dynamic allocation and coordination of auto-navigating vehicles. For instance, while concentrating fast-moving goods is helpful for manual selectors, it creates traffic jams, and the effects could be emulated in a more distributed fashion using dynamic allocation and coordination of auto-navigating vehicles.

Other items that could be used to optimize the schedule around include, but are not limited to: deadlines for particular picklists, maintaining a maximum-delay limit per order (e.g. complete each order within X hours of its submission, where X can be a parameter set via the WMS 140), managing order selector (e.g., human) fatigue levels, smoothing facility output across the shift.

To date, the independent direction of robot pallet jack and human order selectors equipped with order selector devices to perform a coordinated, distributed task of order fulfillment has not be conceived of and reduced to practice.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It will be understood that the inventive concepts can be defined by any combination of the claims, regardless of the stated dependencies, wherein different combinations of claims can represent different embodiments of the inventive concepts.

What is claimed is:

1. An electronic travel management method, comprising:
providing a management system in communication with a plurality of robotic vehicles and a plurality of mobile selector units, each robotic vehicle executing a route and each mobile selector unit having a wireless communication device, wherein each route comprises a pick list identifying pick locations of items to be picked to fulfill an order; and
the management system orchestrating deployment and redeployment of the mobile selector units in real or near-real time with travel of the plurality of robotic vehicles, including:
tracking locations and movement of the robotic vehicles along their respective routes;
tracking locations of the mobile selector units;
estimating time of arrival to a next location of a robotic vehicle by the mobile selector units to orchestrate travel among the mobile selector units and the plurality of autonomous vehicles; and
directing the mobile selector units to future locations of the robotic vehicles based on locations of the robotic vehicles, routes of the robotic vehicles, and locations of the mobile selector units,
wherein future locations of the robotic vehicles include future pick locations of the respective robotic vehicle routes.

2. The method of claim 1, wherein routes of one or more of the plurality of robotic vehicles passes through a plurality of pick zones and the method includes confining travel of at least one of the mobile selector units to a subset of the plurality of pick zones.

3. The method of claim 1, wherein routes of one or more of the plurality of robotic vehicles passes through a plurality of pick zones and the method includes confining travel of at least one of the mobile selector units to one of the plurality of pick zones.

4. The method of claim 1, wherein directing the mobile selector units to future locations of the robotic vehicles includes communicating navigation instructions to at least one of the mobile selector units.

5. The method of claim 4, further comprising outputting the navigation instructions to at least one of the mobile selector units as text, a dynamically updated map of the facility, and/or audio.

6. The method of claim 4, further comprising outputting the navigation instructions within the context of a map or other representation of a warehouse facility.

7. The method of claim 1, wherein orchestrating travel further comprises automatically performing congestion avoidance analysis based on locations of one or more of the mobile selector units and locations and/or next pick locations of one or more of the plurality of robotic vehicles.

8. The method of claim 7, further comprising directing travel of one or more of the plurality of robotic vehicles based, at least in part, on the congestion avoidance analysis.

9. The method of claim 7, further comprising directing travel of one or more of the mobile selector units based, at least in part, on the congestion avoidance analysis.

10. The method of claim 7, further comprising directing travel of one or more of the mobile selector units and one or more of the plurality of robotic vehicles based, at least in part, on the congestion avoidance analysis.

11. The method of claim 7, further comprising performing the congestion avoidance also based on other potential sources of congestion including humans, other vehicles, hazards, mobile equipment, and/or a dynamically updated map.

12. The method of claim 7, further comprising performing the congestion avoidance also based on other travel speeds of the one or more of the mobile selector units and/or the one or more of the plurality of robotic vehicles.

13. The method of claim 7, further comprising performing the congestion avoidance also based on routes of the one or more of the plurality of robotic vehicles.

14. The method of claim 1, wherein the plurality of robotic vehicles includes an autonomous forklift, high-lift, and/or pallet truck.

15. The method of claim 1, wherein one or more of the mobile selector units take the form of a handheld mobile terminal.

16. The method of claim 1, wherein one or more of the mobile selector units take the form of a mobile phone or tablet.

17. The method of claim 1, wherein one or more of the mobile selector units take the form of a vehicle-based mobile terminal.

18. The method of claim 1, wherein orchestrating travel further comprises reducing travel distances and/or travel times of the mobile selector units and/or the robotic vehicles.

19. The method of claim 1, wherein orchestrating travel further comprises dynamically determining and wirelessly communicating next navigation instructions to the plurality of mobile selector units based, at least in part, on changes in the locations of the mobile selector units and/or the robotic vehicles.

20. The method of claim 1, wherein one or more of the mobile selector units is a mobile selector robot.

* * * * *